United States Patent [19]
Idoeta

[11] Patent Number: 6,036,339
[45] Date of Patent: Mar. 14, 2000

[54] MOTORCYCLE HEADLIGHT MOUNTING

[76] Inventor: Gaizka Idoeta, 19 Prospect St., Newark, N.J. 07105

[21] Appl. No.: 08/929,521

[22] Filed: Sep. 15, 1997

[51] Int. Cl.[7] ........................................... B62J 6/02
[52] U.S. Cl. ................................. 362/476; 362/474
[58] Field of Search ........................ 362/473, 474, 362/475, 476

[56] References Cited

U.S. PATENT DOCUMENTS

| | | | |
|---|---|---|---|
| 2,124,222 | 7/1938 | Wiley | 362/475 |
| 3,099,400 | 7/1963 | Holmes | 362/476 |
| 3,922,031 | 11/1975 | Hugon | 362/476 |
| 4,722,031 | 1/1988 | Matsuyama et al. | 362/476 |
| 5,580,152 | 12/1996 | Carter | 362/474 |
| 5,872,510 | 2/1999 | O'Shaughnessy | 362/474 |

FOREIGN PATENT DOCUMENTS

| | | | |
|---|---|---|---|
| 1000707 | 1/1957 | Germany | 362/474 |
| 823617 | 11/1959 | United Kingdom | 362/476 |

*Primary Examiner*—Alan Cariaso
*Attorney, Agent, or Firm*—Evelyn M. Sommer

[57] ABSTRACT

Motorcycle headlight assemblies are positioned in front of the motorcycle front fork. In one embodiment of the invention, the headlight assembly is positioned in front of the front fork as a consequence of being mounted on one or more projections emanating from the front fork. In alternative embodiments, the headlight assembly is positioned in front of the front fork on the front fender.

13 Claims, 13 Drawing Sheets

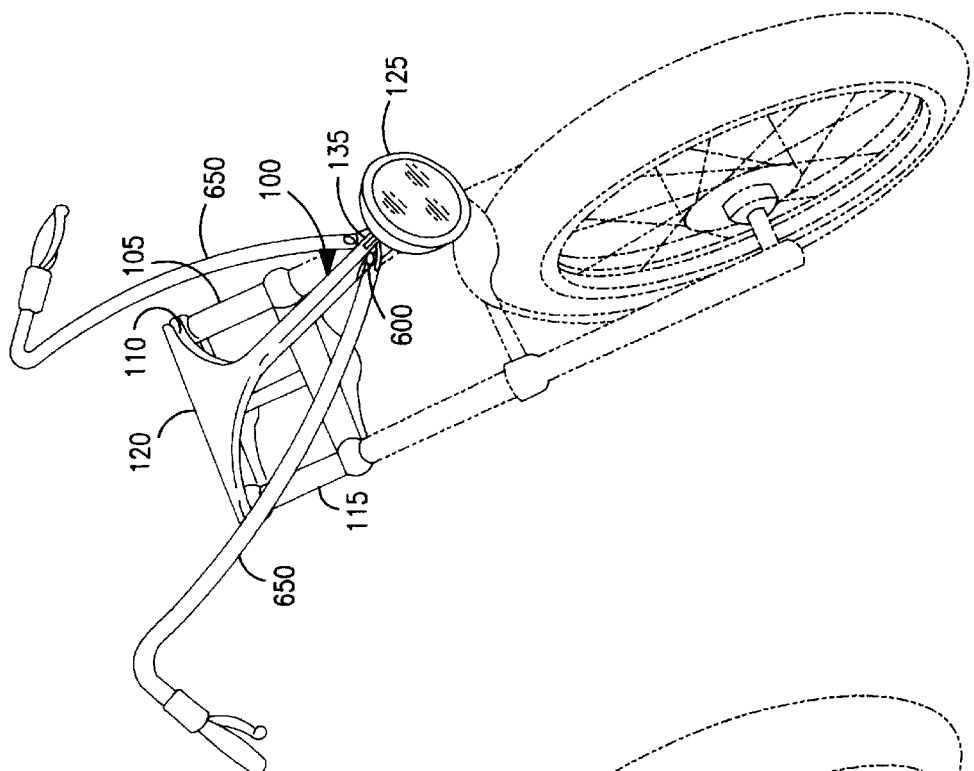
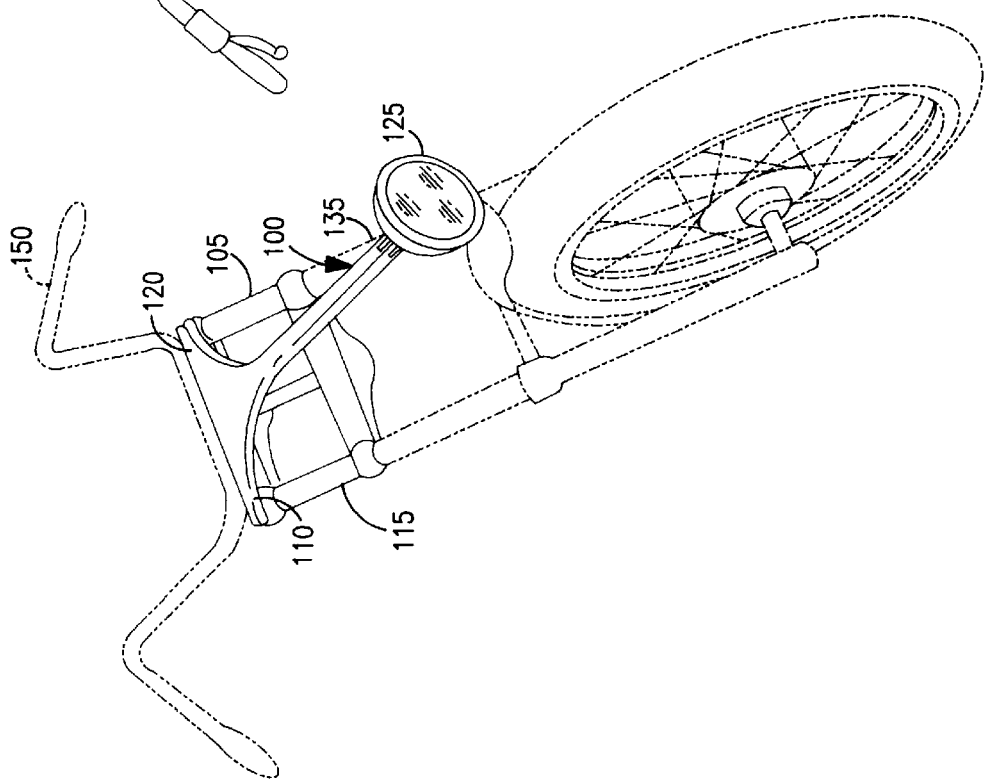

MOTORCYCLE HEADLIGHT MOUNTING

BACKGROUND OF THE INVENTION

The present invention relates to a motorcycle headlight mounting means, and more particularly to a means for mounting a headlight on a motorcycle remote from the front fork of the motorcycle.

Production motorcycle headlight assemblies are frequently replaced by a custom or modified headlight assembly. These custom headlights are added both for their appearance and to improve headlight performance. However, heretofore, the means for mounting a headlight on a motorcycle placed the headlight in close proximity to the front fork of the motorcycle. This configuration has limited the range of options available for customizing a motorcycle.

It is an object of the present invention to provide a means for mounting a motorcycle headlight away from the front fork of a motorcycle.

SUMMARY OF THE INVENTION

The present invention provides a means for mounting a motorcycle headlight in a position remote from the front fork of the motorcycle. In one embodiment of the present invention, the motorcycle headlight assembly is positioned on a projection attached to the front fork of the motorcycle. In an alternative embodiment of the present invention, the motorcycle headlight assembly is positioned on the front fender of the motorcycle. In another alternative embodiment of the present invention, the motorcycle headlight assembly is positioned on a forwardly projecting extension of one or more handlebars.

In addition to providing a means for mounting the motorcycle headlight remote from the front fork of the motorcycle, the present invention permits one to modify a motorcycle in numerous other ways heretofore not available. For example, instead of having the handle bars attached directly to the front fork of the motorcycle, the present invention attach to a headlight projection, which in turn, attaches to the front fork of the motorcycle.

BRIEF DESCRIPTION OF THE DRAWINGS

FIG. 2 shows a top elevational view of the motorcycle headlight mounting means embodiment of FIG. 1;

FIG. 3 shows a partial cut away view of the motorcycle headlight mounting means of FIG. 2 taken along line 3—3;

FIG. 10a shows a partial cut away view of the motorcycle headlight mounting means of FIG. 10 taken along line 10a—10a;

DESCRIPTION OF THE PREFERRED EMBODIMENTS

Figure 1:
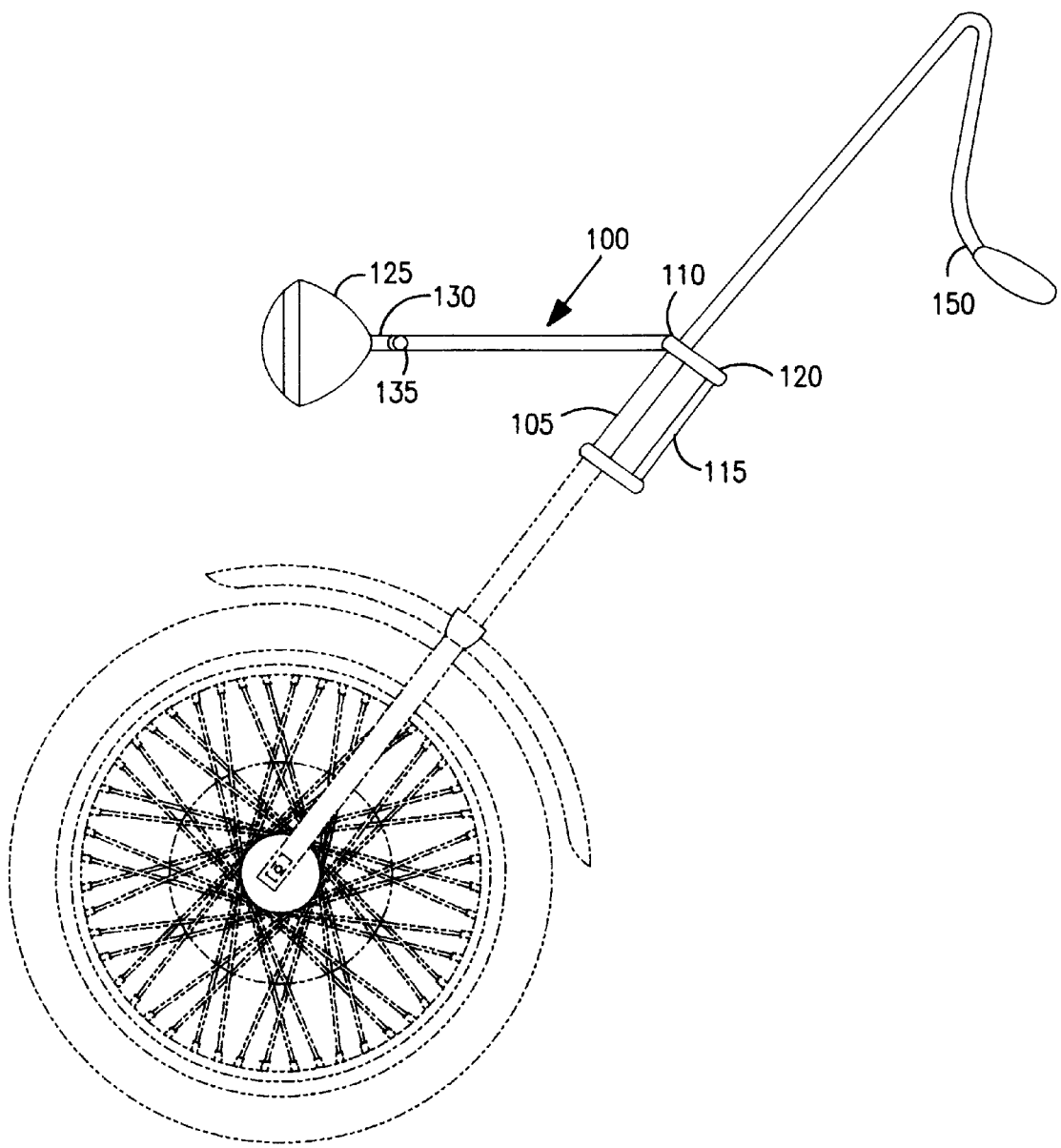
FIG. 1 shows a side plan view of an embodiment of the motorcycle headlight mounting means of the present invention.

Referring now to the drawings, FIG. 1 illustrates a first embodiment of the motorcycle headlight mounting means indicated by general reference numeral 100. Headlight mounting means 100 is attached to motorcycle front fork 105 by conventional attachment means at position 110.

In this embodiment, as shown in FIG. 2, headlight mounting means 100 is at attached to front fork structure 115 as an extension of front fork piece 120. It is preferred that the angle formed by the intersection of headlight mounting means 100 and front fork piece 120 is substantially the same as the acute angle formed by be intersection of a projection of the front fork and the ground. Thus, in the preferred embodiment, headlight mounting means 100 is substantially parallel to the ground.

Headlight assembly 125 has a backwardly projecting bracket 130 that attaches to headlight mounting means 100 by a conventional means at intersection 135. For example, backwardly projecting bracket 130 may attached to headlight mounting means 100 by means of a nut and bolt. In a further preferred embodiment, the beam emitted by headlight assembly 125 is adjusted by altering the angle at which headlight assembly 125 connects to headlight mounting means 100.

Also shown, in FIG. 2, is cable 200 which runs through headlight mounting means 100 and backwardly projecting bracket 130 to headlight assembly 125. Cable 200 is also seen traversing headlight mounting means 100 in FIG. 3.

Typically, cable 200 is attached to a conventional high beam control switch (not illustrated).

Figure 4:
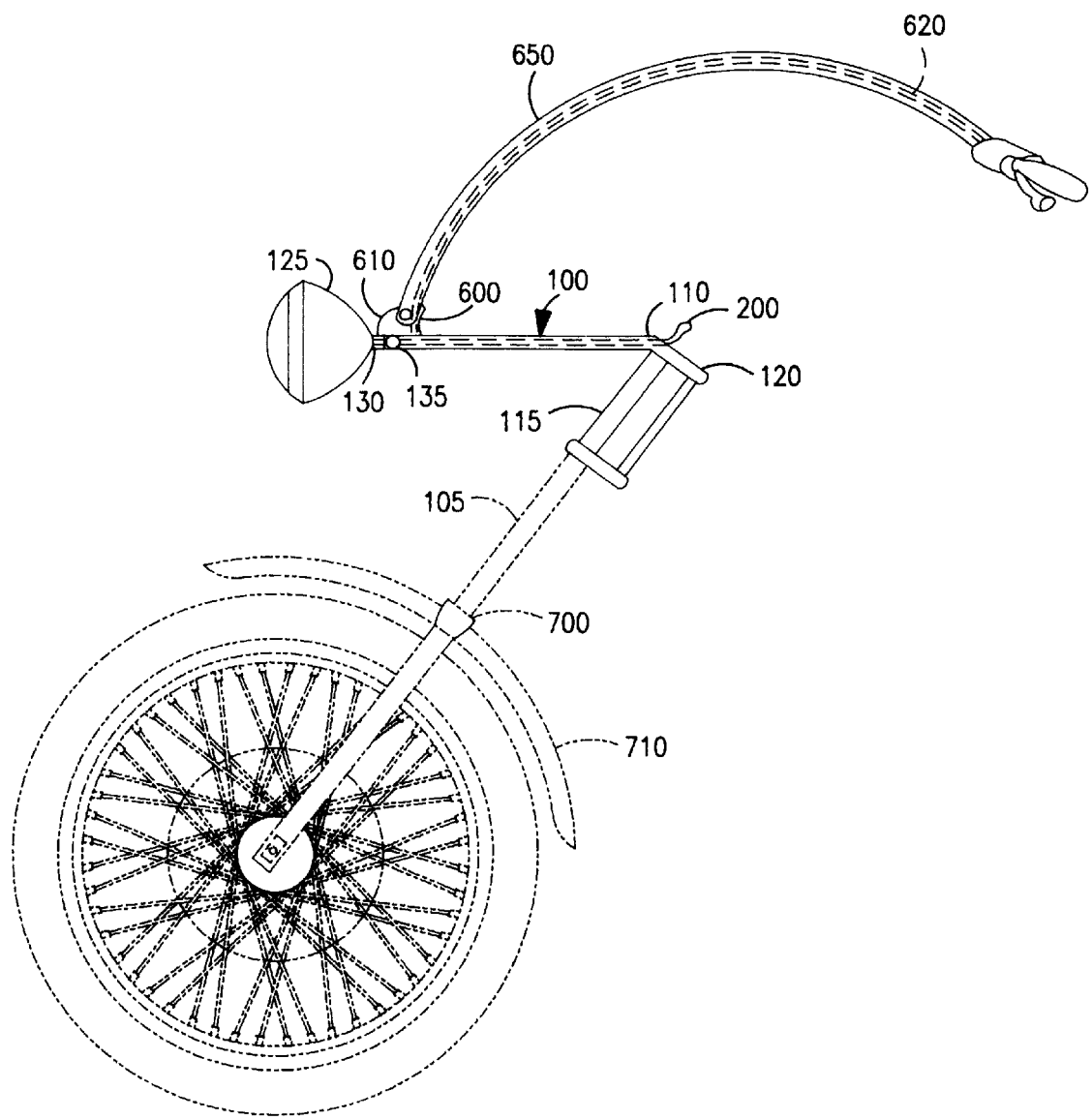
FIG. 4 shows a partial cut away view of the motorcycle headlight mounting means of FIG. 2 taken along line 4—4.

FIG. 4 shows cable 200 traversing front fork piece 120.

FIG. 1 also illustrates a conventional attachment of handle bars 150 to front fork 105 at intersection 110 on front fork piece 120.

Figure 5:
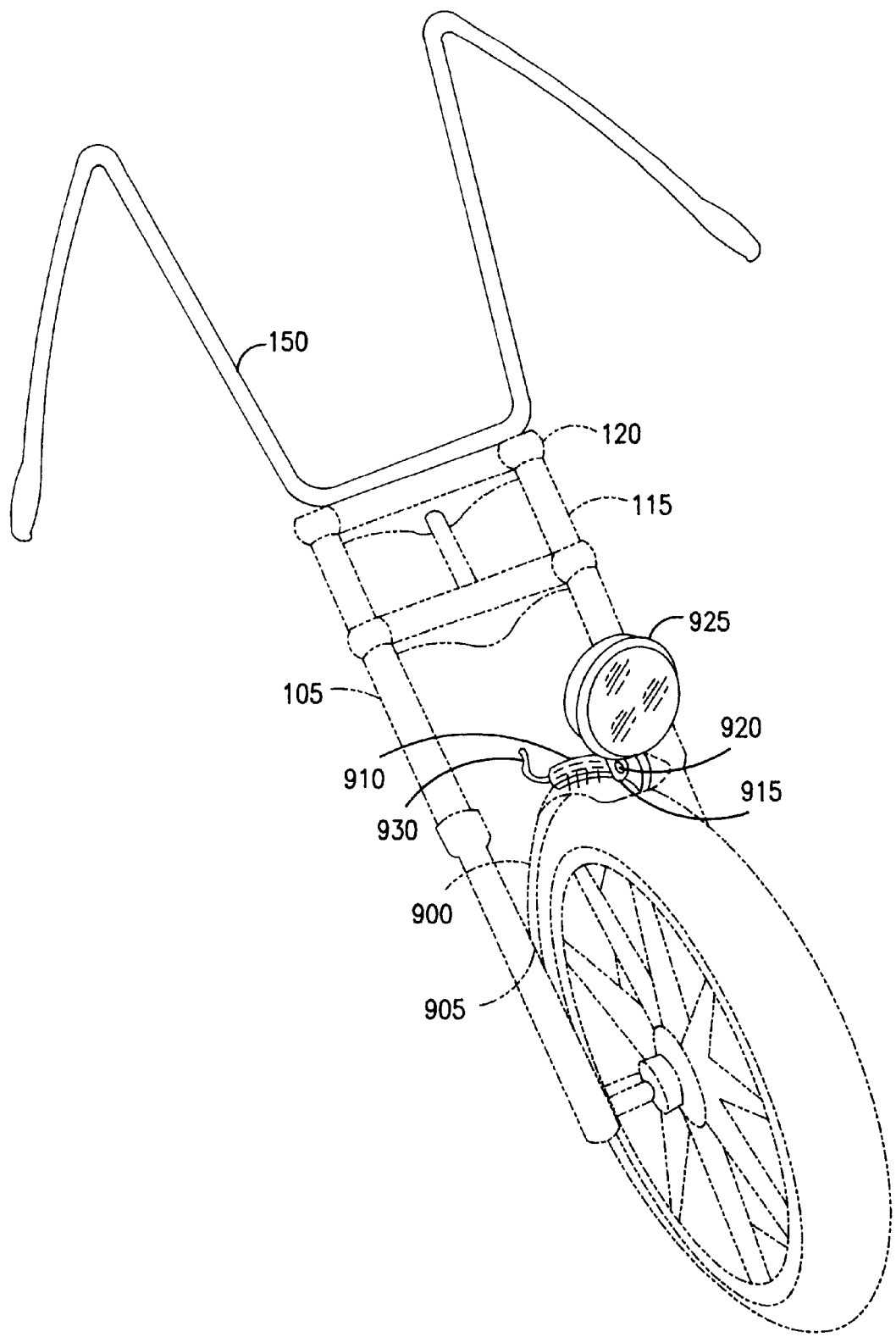
FIG. 5 shows a front elevational view of the motorcycle headlight mounting means of FIG. 1.

FIG. 5 shows the front of a motorcycle employing an embodiment of the present invention. Front fork 105 includes front fork structure 115 with front fork piece 120. Extending from front fork piece 120, and as an integral piece thereof, albeit bent, is headlight mounting means 100. Attached to the projecting end of headlight mounting means 100 is motorcycle headlight 125 which pieces are connected at intersection 135 of a backwardly projecting bracket 130 on the motorcycle headlight 125. FIG. 5 also illustrates a conventional attachment of handle bars 150 to front fork 105 at intersection 110 on front fork piece 120.

In an adaption of this embodiment of the present invention, the length and angle of headlight mounting means 100 is adjustable. Preferably, the length of headlight mounting means 100 is adjustable to at least three positions between about 10 and 18 inches from front fork 105. It is further preferred that the adjustable positions are pre-defined and fixed. Alternatively, the handlebars can be constructed so that they rise upwardly to a height of about 30 inches and then curve downwardly and outwardly. The increase in height and the curvature function as a safety feature and are instrumental in avoiding the driver being thrown from the motorcycle.

Figure 6:
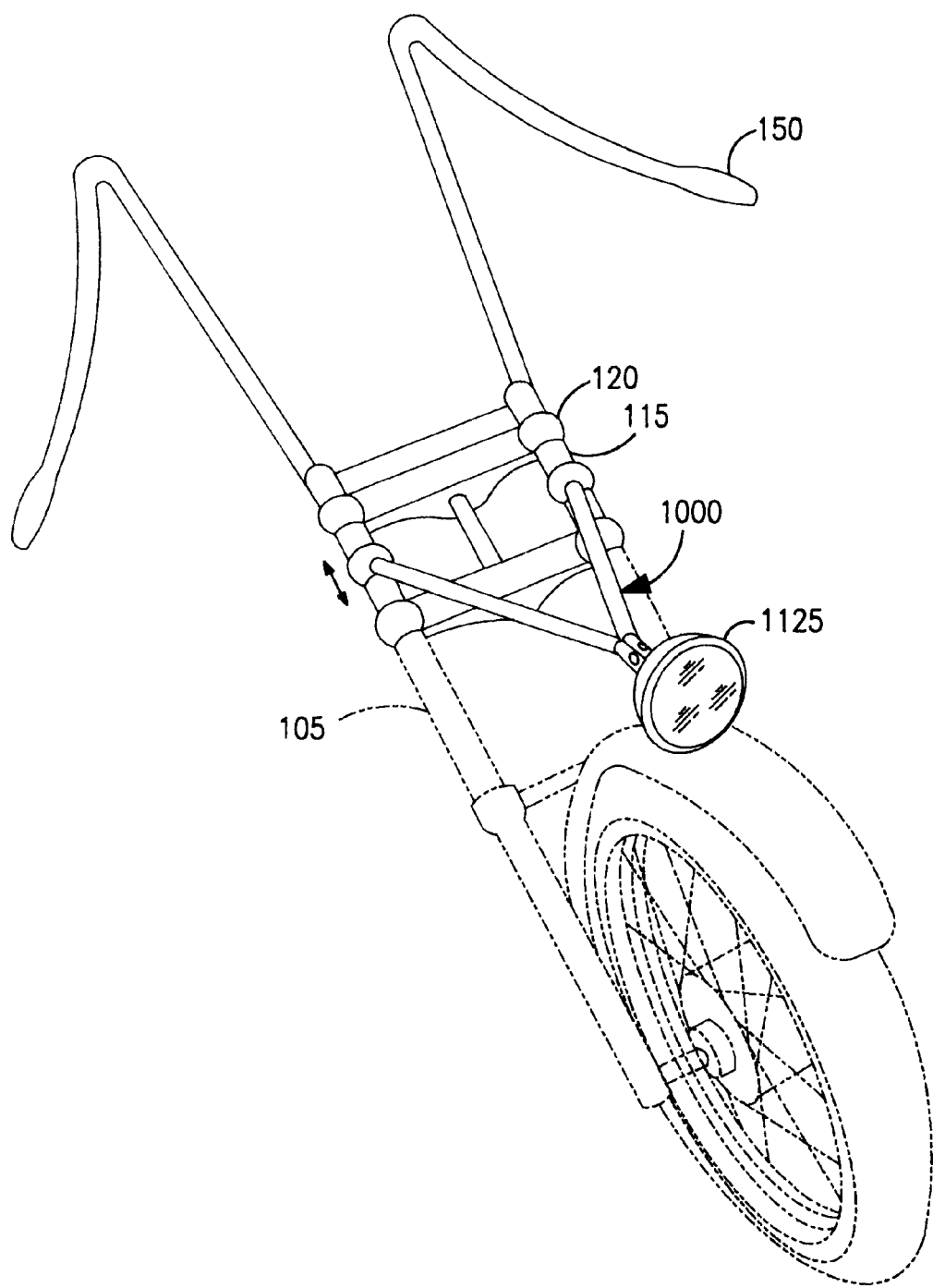
FIG. 6 shows a front elevational view of an alternative embodiment of the motorcycle headlight mounting means of the present invention.

FIG. 6 illustrates the front of a motorcycle employing an alternative embodiment of the present invention. Front fork 105 includes front fork structure 115 with front fork piece 120. Extending from front fork piece 120, and as an integral piece thereof, albeit bent, the is headlight mounting means 100. Attached to the projecting end of headlight mounting means 100 is motorcycle headlight 125 which pieces are connected at intersection 135 of a backwardly projecting bracket 130 on the motorcycle headlight 125.

In the embodiment of FIG. 6, handle bars 650 are connected to front fork 105 via connection to the headlight mounting means 100. Specifically, handle bars 650 are attached to headlight mounting means 100 at handle bar mounting intersections 600 by conventional means, such as projecting brackets.

Handle bars 650 typically rise at least about 12 inches, preferably at least about 15 inches, and more preferably at least about 18 inches from the top of front fork 105. It is believed that such rising handle bars reduce the likelihood that the motorcycle rider will be thrown in front of the motorcycle in the event of a collision.

Figure 7:
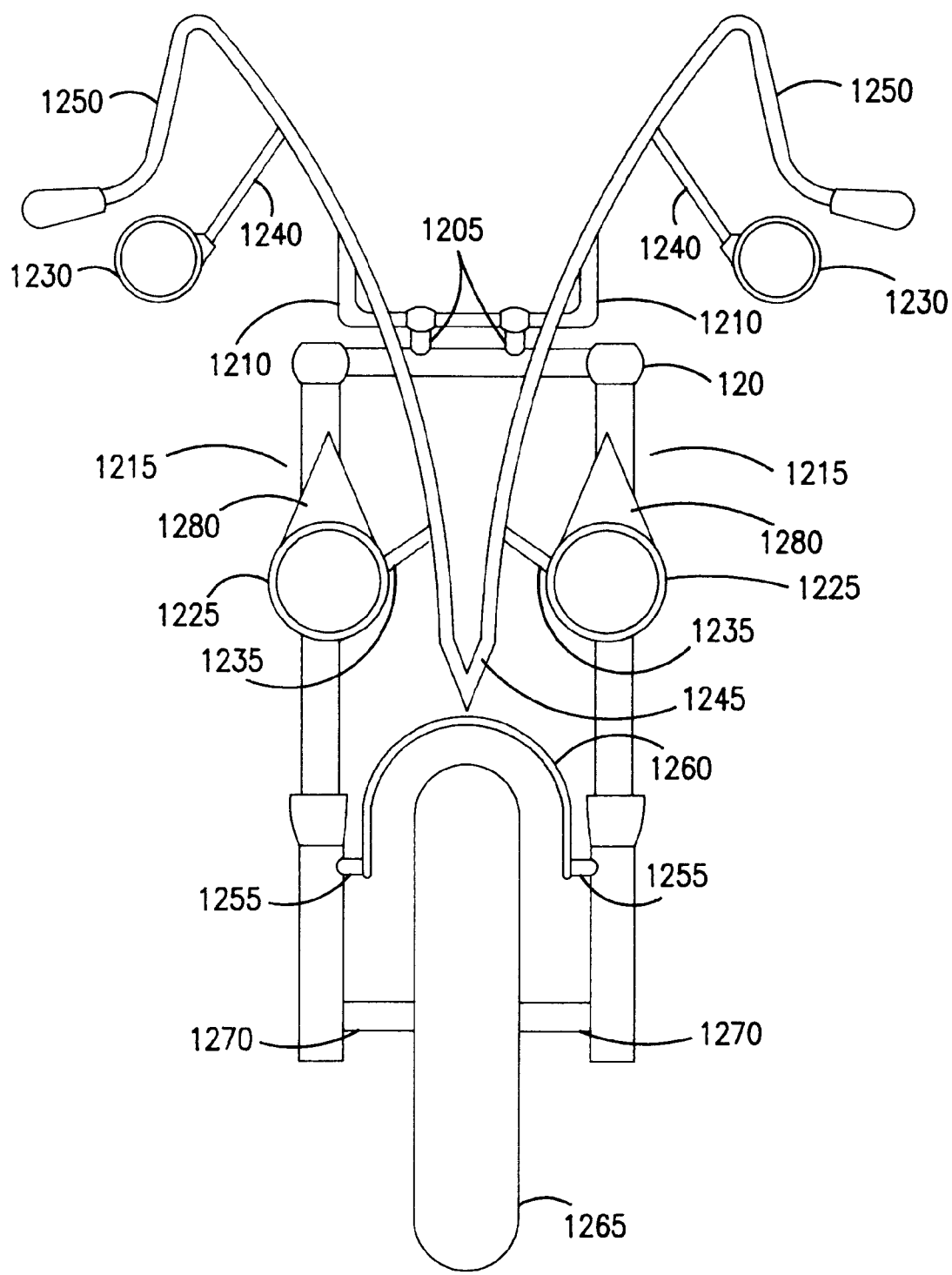
FIG. 7 shows a side plan view of the alternative embodiment of the motorcycle headlight mounting means shown in FIG. 6.

FIG. 7 presents a side view of the embodiment of FIG. 6. Again in FIG. 7, front fork 105 includes mounting means structure 115 and its top front fork piece 120. FIG. 7 illustrates an integral, one piece combination of headlight mounting means 100 with front fork piece 120. In this alternative embodiment, the angle formed by the intersection of headlight mounting means 100 and front fork piece 120 at intersection 110 is substantially equal to the acute angle formed by the front fork 105 and the ground.

FIG. 7 also shows headlight assembly 125 having backwardly projecting bracket 130 attached to headlight mounting means 100 at intersection 135.

Alternative handle bars 650 are connected to front fork 105 by a headlight mounting means 100. Specifically, handle bars 650 are mounted at intersections 600 on handle bar mountings 610 which handle bar mountings 610 are attached to headlight mounting means 100.

Handle bar cables 620 travel through handle bars 650 and join with headlight cable 200 at the intersection of handle bars 650 and headlight mounting means 100. Thereafter, the two cables travel together through headlight mounting means 100 to front fork structure 115.

In a further adaptation of the embodiment of the present invention shown in FIG. 7, a utility space is created by the region bound by intersection 700 (where front fork 105 intersects with fender 710), front fork 105, and headlight mounting means 100. This utility space may be enclosed and provide storage for tools, food, camping gear and the like. When this utility space is enclosed, such enclosure may be constructed from a conventional plastic such as ABS plastic, fiberglass, or a conventional light weight metal such as aluminum. It is preferred that the enclosure is chrome plated.

In an alternative version of this embodiment of the present invention, a utility bag is disposed downwardly from headlight mounting means 100. In such an embodiment, headlight mounting means 100 may have a plurality of utility bag attachment means located along the length of said headlight mounting means 100. Such a utility bag may be constructed of conventional materials such as leather, plastic or metal.

In a further alternative version of this embodiment of the present invention, a storage space can be created withing the region formed by headlight mounting means 100 and handlebars 650 from any conventional materials. Such a region may also include one or more gauges.

In addition, one or more mirrors may be mounted on handle bars 650. Such mirrors are mounted on handle bars 650 in a conventional manner. The mirrors may be conventional mirrors or they may be adapted to provide a unique appearance to the motorcycle.

Furthermore, a conventional windshield can be mounted on handlebars 650.

Figure 8:
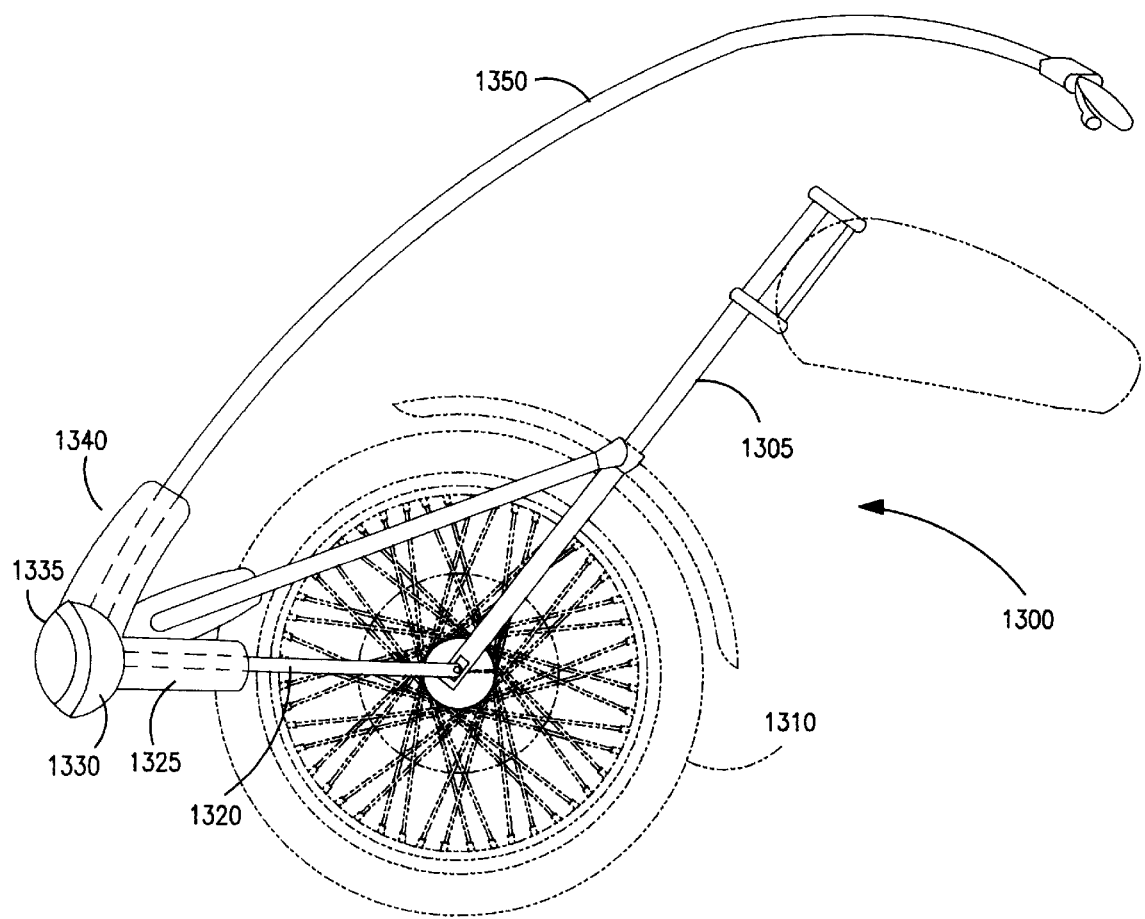
FIG. 8 shows a top elevational view of the motorcycle headlight mounting means embodiment of FIG. 6.

FIG. 8 illustrates a top view of the alternative embodiment of FIG. 7. Again, front fork structure 115 including front fork piece 120 is connected to headlight mounting means 100 at intersection 110. At the other end of headlight mounting means 100, backwardly projecting bracket 130 of headlight assembly 125 attaches to headlight mounting means 100 at intersection 135.

In the embodiment illustrated in FIG. 8, headlight mounting means 100 has a pair of handle bar mounting brackets 610 in close proximity to headlight assembly intersection 135. Attached to each of the headlight mounting brackets 610 at intersections 600 is a handle bar 650. Handle bars 650 are secured to handle bar mounting brackets 610 by a conventional means 615, such as nuts and bolts.

Typically, headlight mounting means 100 ranges in length from about 10 to 18 inches, and preferably headlight mounting means 100 ranges in line from about 12 to 16 inches. Headlight mounting means 100 can vary in diameter from about 0.5 to 1.25 inches, and preferably headlight mounting means 100 has a diameter between about 0.75 to 1 inches.

While headlight mounting means 100 typically has an approximately circular cross-sectional shape, headlight mounting means 100 can have substantially any cross-sectional shape, such as triangle, a square, a pentagon or a diamond.

Figure 9:
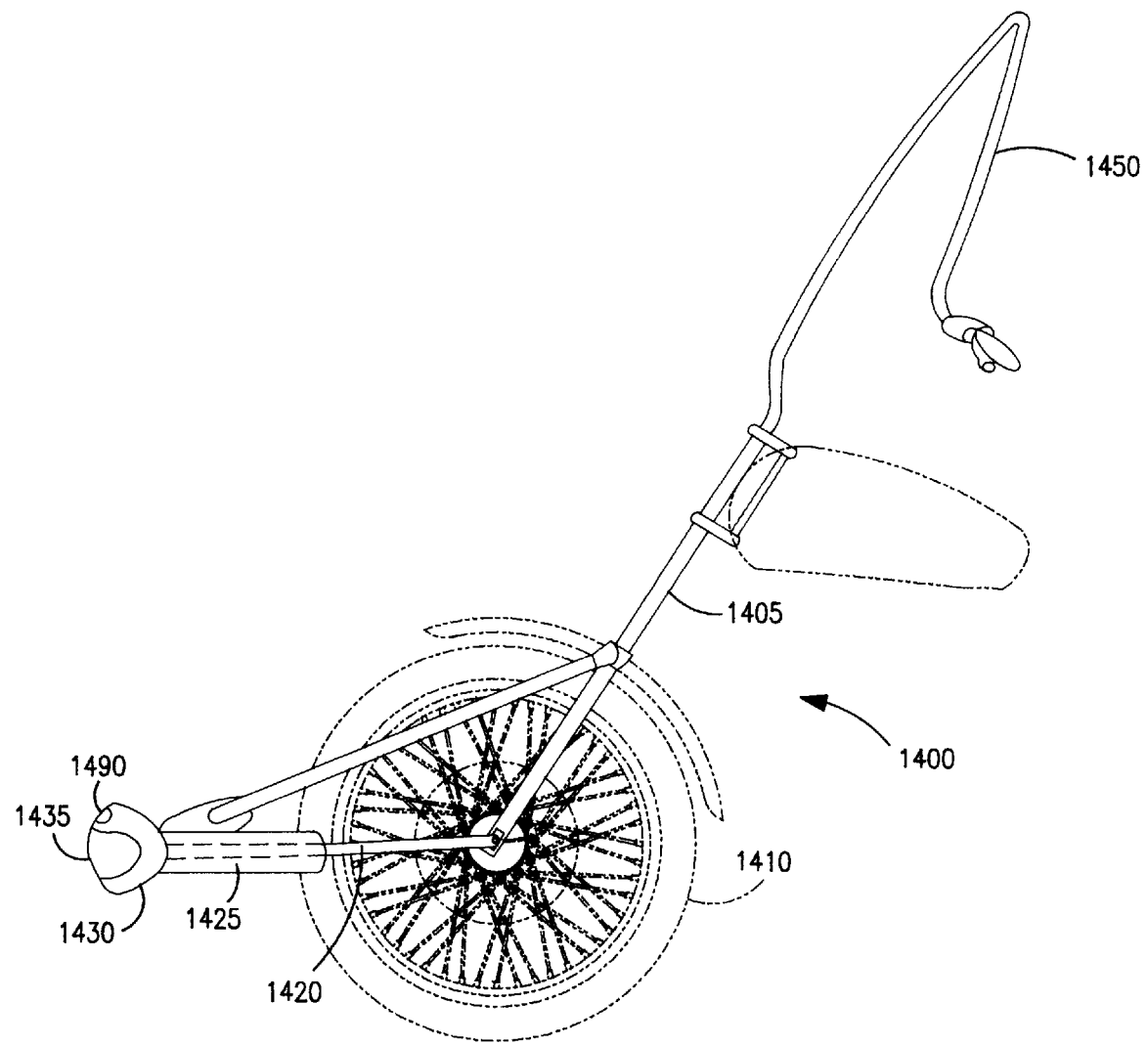
FIG. 9 shows a front elevational view of another alternative embodiment of the motorcycle headlight mounting means of the present invention.

FIG. 9 illustrates a further alternative embodiment of the present invention. In this embodiment, conventional handle bars 150 are attached to front fork piece 120 of front fork structure 115 in a conventional manner. Additionally, conventional front fork 105 has mounted thereon a front fender 900 at fender mounting means 905. Mounted on front fender 900 is conduit 910.

Headlight assembly 925 has a downwardly projecting bracket 915 which attaches to conduit 910 at intersection 920 in a conventional manner. Preferably, the connection of downwardly projecting bracket 915 to conduit 910 at intersection 920 is adjustable so that the direction of the beam of headlight assembly 925 can be readily adjusted.

Traversing conduit 910 and traveling to headlight assembly 920 is conventional headlight cable 930.

Figure 10:
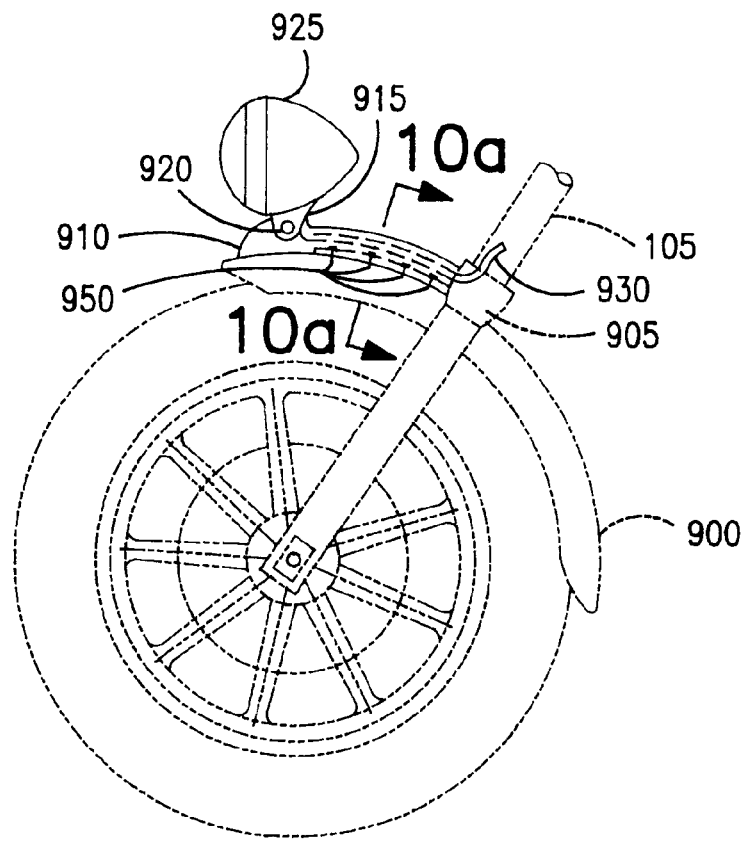
FIG. 10 shows a side plan view of the alternative embodiment of the motorcycle headlight mounting means shown in FIG. 9.

FIG. 10 presents a partial side view illustrating this embodiment of the present invention. Again in this figure, attached to front fork 105 at fender mounting means 905 is front fender 900. Conduit 910 is attached to front fender 900 by conventional conduit attaching means 950. Examples of useful conventional conduit attaching means 950 are screws, rivits, and adhesive. Downwardly projecting bracket 915 attached is to conduit 910 at intersection 920. Headlight cable 930 again is seen in this figure traversing conduit 910 and going to headlight assembly 925.

In the embodiment of FIGS. 9 and 10, headlight assembly 925 is typically spaced between about 5 and 15 inches forward of front fork 105. It is preferred that in this embodiment, headlight assembly 925 is spaced between about 7 and 12 inches forward of front fork 105. Alternatively, headlight assembly 925 is placed substantially over the axle of the front wheel.

In a further adaptation of the embodiment of FIGS. 9 and 10, a utility bag be mounted on front fork 105. For example, a utility bag may be mounted where the headlight assembly would have been attached to the motorcycle in the prior art. For example, looking at FIG. 9, the utility bag can be mounted off of front fork piece 105. Such a utility bag may be constructed of leather, plastic or metal.

Figure 10A:
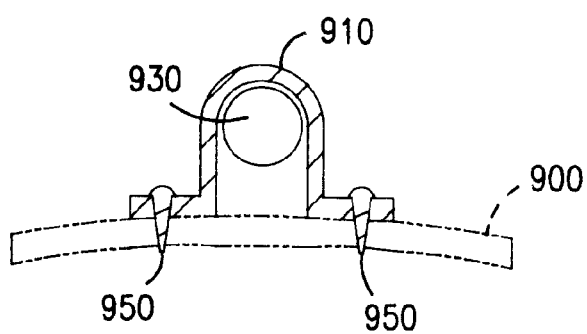

FIG. 10a provides a cross-sectional view taken along line 10a—10a of FIG. 10. This view shows conduit 910 secured to front fender 900 by connecting means 950. Headlight cable 930 can also be seen in this cross-sectional view.

Figure 11:
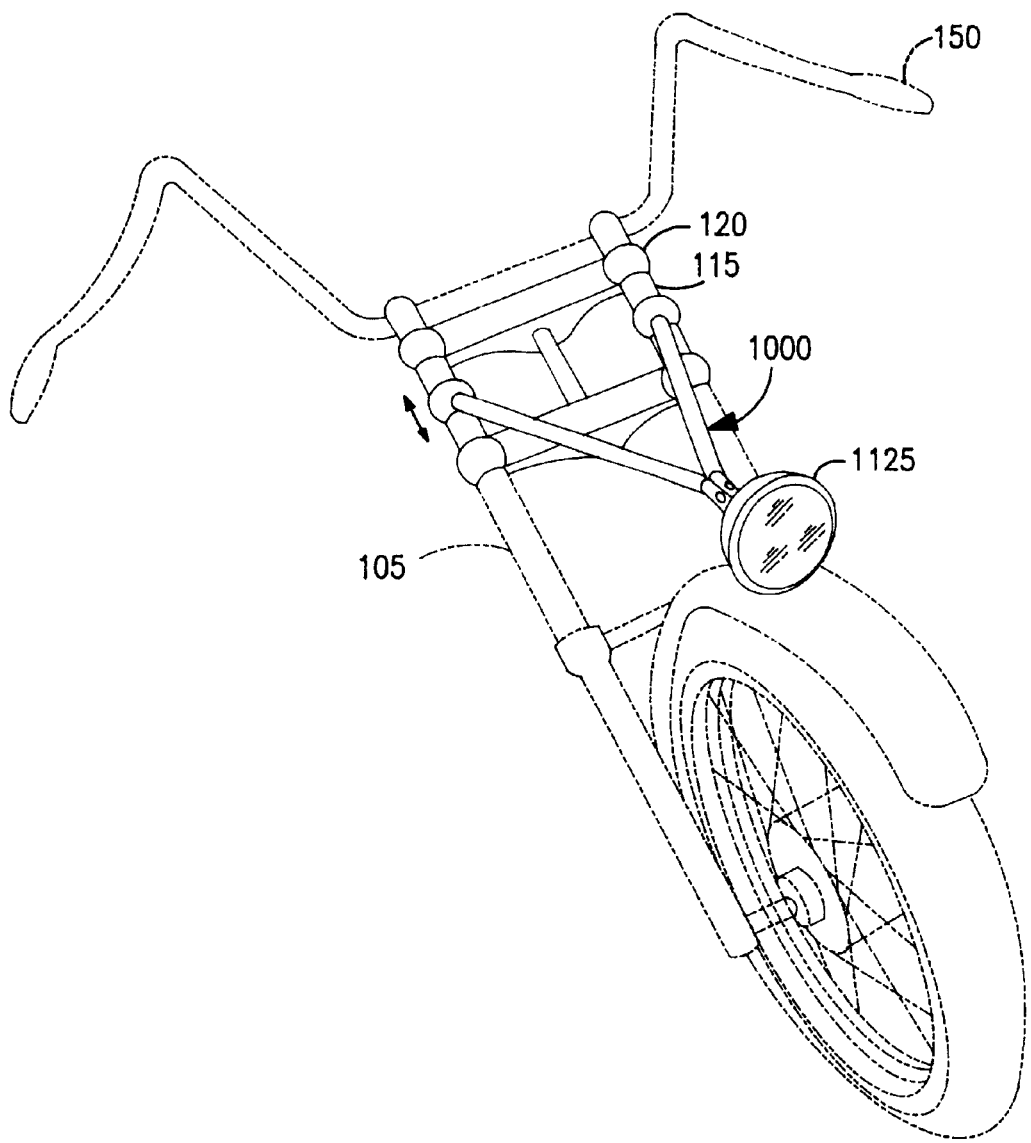
FIG. 11 shows a front elevational view of a further alternative embodiment of the motorcycle headlight mounting means of the present invention.

FIG. 11 shows yet another embodiment of the present invention in which headlight assembly 1125 is connected to a pair of headlight mounting bars 1100. Headlight mounting bars 1100 each connect to one of the 2 vertical members of front fork structure 115. In this embodiment, handle bars 150 are connected to front fork piece a 120 in a conventional manner.

Furthermore, the embodiment shown in FIG. 11 herein, may be modified so that the handlebars are connected to the headlight mounting means through a handlebar mounting bracket located closely adjacent to the headlight assembly intersection.

Figure 12:
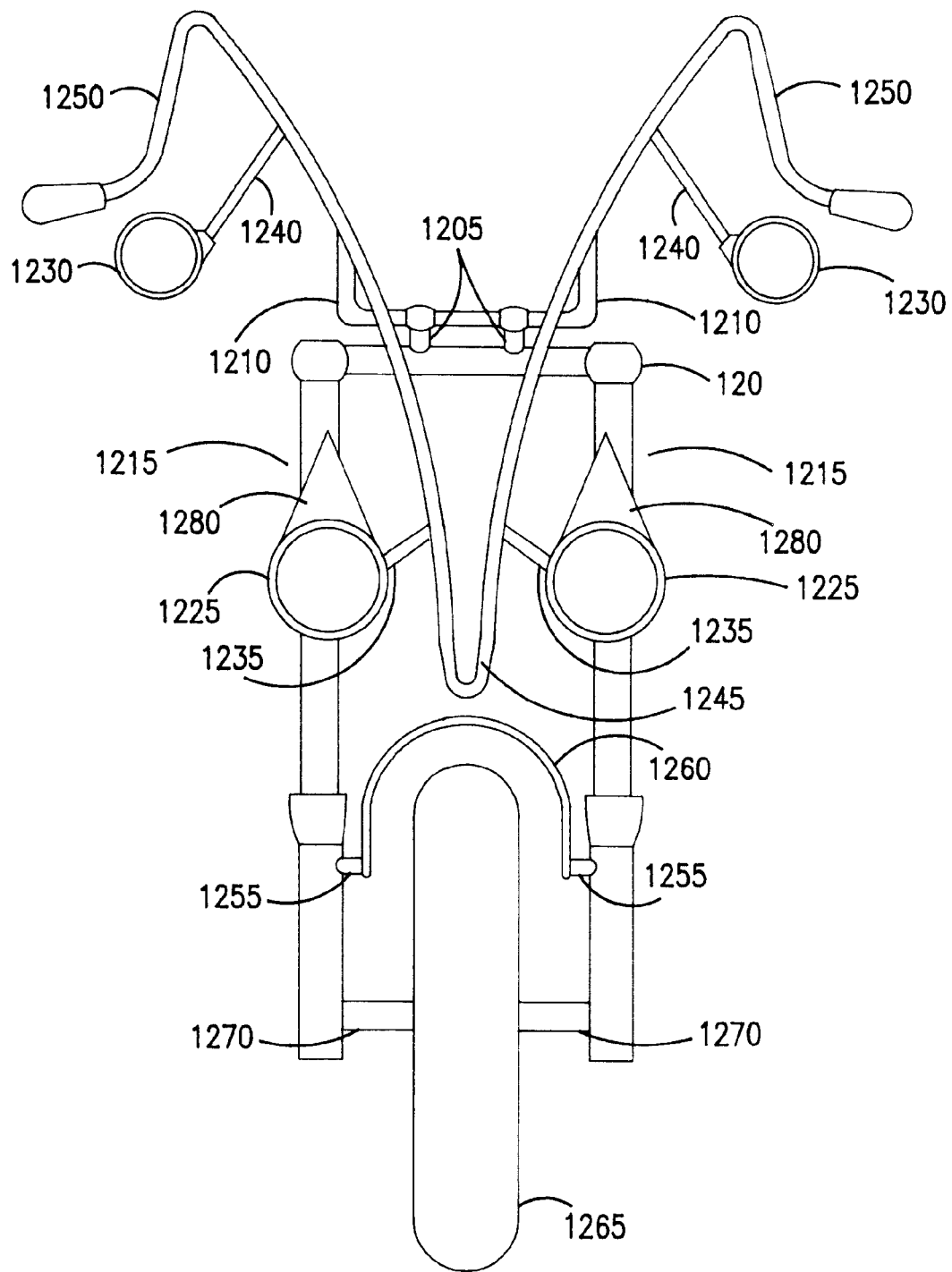
FIG. 12 shows a front elevational view of a yet further alternative embodiment of the motorcycle headlight mounting means of the present invention.

FIG. 12 presents a further adaptation of this embodiment of the present invention. In the adaptation of FIG. 12, handle bars 1250 are mounted on handle bar supports 1210. Handle bar supports 1210, in turn, are mounted onto front fork piece 120. On each side of front fork piece 120 is a bar 1215 of the front fork. Front fender 1260 is mounted on the two bars 1215 at positions 1255. Additionally, axle 1270 is mounted between the two front fork bars 1215. Wheel 1265 is mounted on axle 1270.

Mirror supports 1240 attach to handle bars 1250 and to mirrors 1230.

Handle bars 1250 extend past handle bar supports 1210 and intersect at point 1245. Between handle bar supports 1210 and intersection point 1245, headlight mounting means 1235 depend from the forward extensions of handle bars 1250. Connected to headlight mounting means 1235 in this embodiment are a pair of headlight assemblies 1225.

The pair of headlight assemblies may be mounted in a horizontal configuration at, or near, the intersection of the headlight mounting bars 1245. In a still further adaptation of this embodiment of the present invention, the headlight assemblies may have a substantially conical shape 1280 are arranged so that the cone portion points backwards. Turning signals may be mounted on cones 1280.

Figure 13:
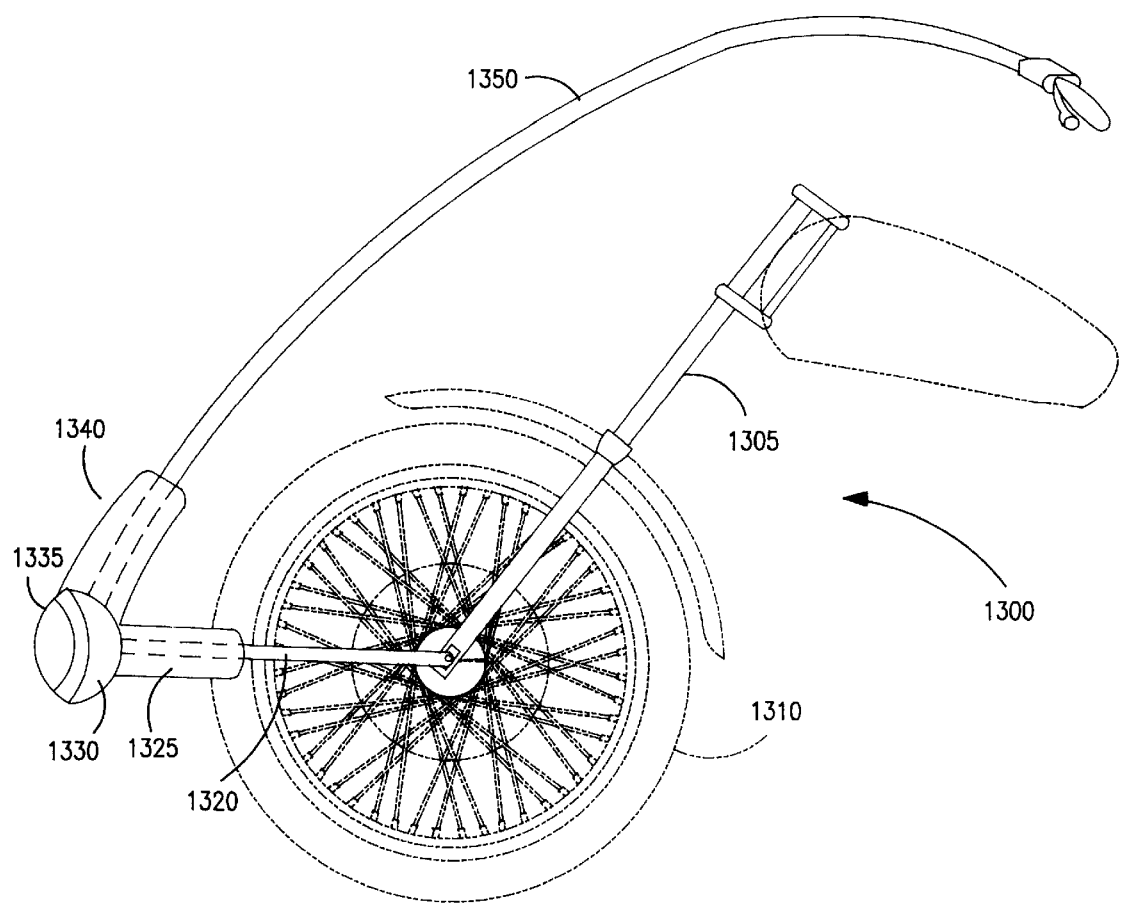
FIG. 13 shows a still further alternative embodiment of the motorcycle headlight mounting means of the present invention.

FIG. 13 provides a partial side view of motorcycle 1300 according to the present invention. In this embodiment of the present invention, front fork piece 1305 connects the bulk of motorcycle 1300 to the front wheel assembly 1310, headlight mounting means 1320, impact absorbing means 1325, headlight assembly 1330 and bulb 1335, shock absorbing means 1340 and handlebars 1350. It is possible in accordance with another embodiment of the present invention to have a light assembly as just described function as a fog light.

Figure 14:
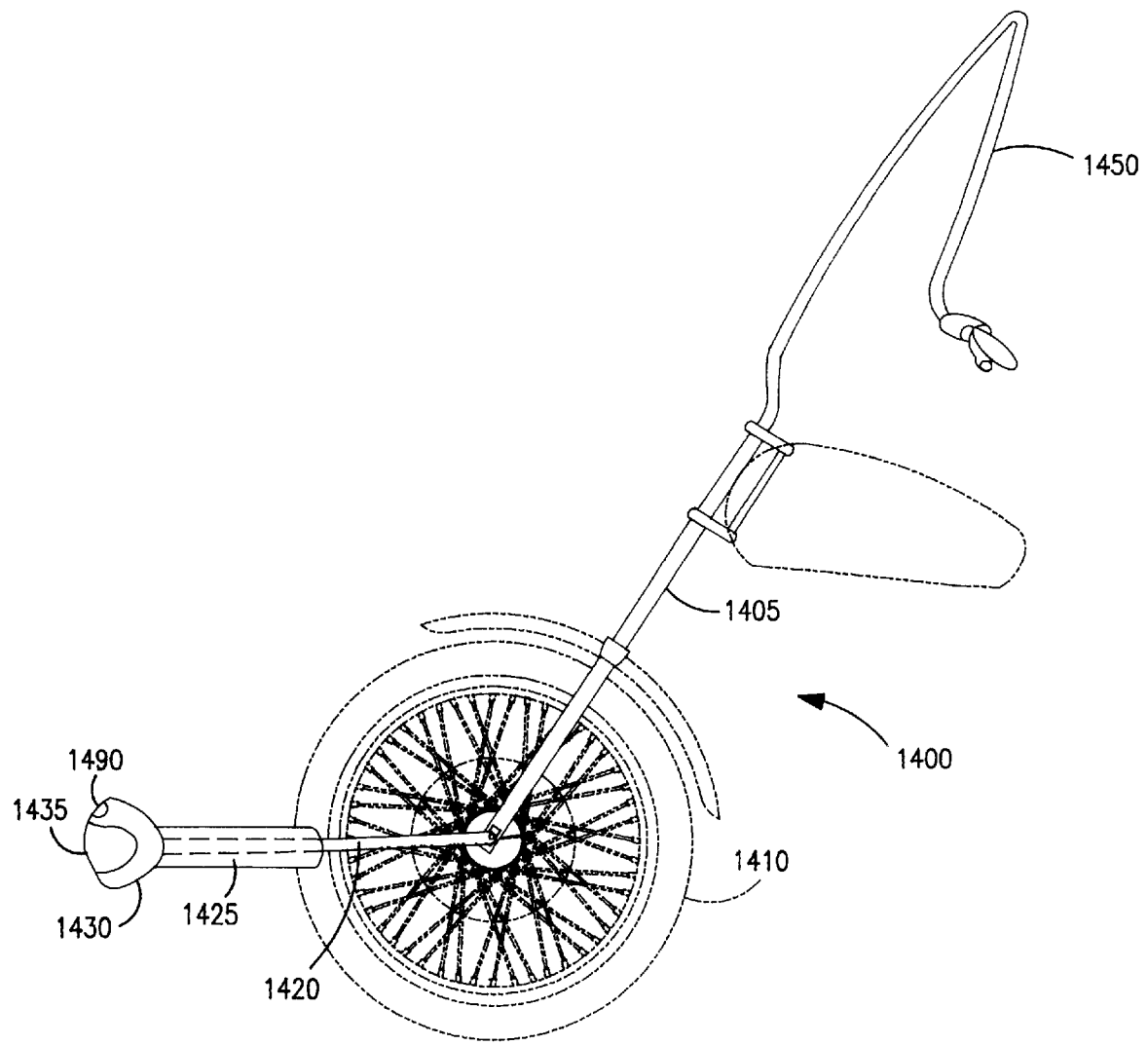
FIG. 14 shows a yet still further alternative embodiment of the motorcycle headlight mounting means of the present invention.

FIG. 14 provides a partial side view of motorcycle 1400 according to the present invention. In this embodiment of the present invention, front fork piece 1405 connects the bulk of motorcycle 1400 to the front wheel assembly 1410, headlight mounting means 1420, impact absorbing means 1425, headlight assembly 1430 and bulb 1435. Also mounted on headlight assembly 1430 is sensor 1490. In this embodiment, handlebars 1450 are attached to the motorcycle in a conventional manner at the top of front fork piece 1405.

The headlight mounting projection of the present invention can function as an energy absorbing system in the event of a collision and in some embodiments may be combined with a conventional air bag.

In an alternative embodiment of the present invention, a rewardly projecting member may be used to mount taillights.

In yet another embodiment of the present invention, the impact absorbing means described in connection with FIG. 13 maybe provided on the rear bumper and serve for mounting the taillights.

In view of the above, it will be seen that the several objects of the invention are achieved and other advantageous results attained.

While the invention has been illustrated and described as embodied in an improved motorcycle headlight mounting means, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What I claim is:

1. A motorcycle headlight fixture for a motorcycle of the type having a frame and a front fork pivotally coupled to the frame which mounts a front wheel in a forward position of the motorcycle, comprising:

a. a motorcycle mounting component which is mounted to the front fork of the motorcycle;

b. a motorcycle headlight extension component having a mounted end which is connected to said motorcycle mounting component and a distal end extending to a forward position of the motorcycle in proximity to the front wheel thereof;

c. a motorcycle headlight socket component which is affixed to a motorcycle headlight and connected to the distal end of said motorcycle headlight extension component.

2. The motorcycle headlight fixture of claim 1 in which said extension component is effective to position said motorcycle headlight at least about 10 inches from said motorcycle mounting component.

3. The motorcycle headlight fixture of claim 1 in which said extension component has means for adjusting the position of said motorcycle headlight in at least three positions between about 10 and 18 inches from said motorcycle mounting component.

4. The motorcycle headlight fixture of claim 1 in which said motorcycle mounting component includes a further mounting component adapted to attach the motorcycle headlight to lower ends of the front fork of the motorcycle.

5. The motorcycle headlight fixture of claim 1 in which said motorcycle mounting component is adapted to attach to a horizontal member of the front fork of the motorcycle.

6. The motorcycle headlight fixture of claim 1 in which said motorcycle mounting component is adapted to attach to two vertical members of the front fork of the motorcycle.

7. The motorcycle headlight fixture of claim 5 in which said motorcycle mounting component is adapted to attach to said horizontal member of the front fork of the motorcycle in two positions.

8. The motorcycle headlight fixture of claim 1 in which said motorcycle mounting component is adapted to attach to a pair of handlebars mounted to the front fork of the motorcycle.

9. The motorcycle headlight fixture of claim 1 in which a pair of handlebars of said motorcycle are attached to said motorcycle headlight extension component.

10. The motorcycle headlight fixture of claim 9 wherein the handle bars rise at least 12 inches from the top of the front fork.

11. A motorcycle having the motorcycle headlight fixture of claim 10 wherein the rising handle bars are effective to restrain a motorcycle rider from going over the front of the motorcycle.

12. The motorcycle headlight fixture of claim 1 in which said motorcycle headlight extension component positions the headlight at a position in front of the front wheel of the motorcycle so that it is effective to absorb at least some of the energy of a front end collision.

13. A motorcycle of the type having a frame and a front fork pivotally coupled to the frame which mounts a front wheel in a forward position of the motorcycle, having a motorcycle headlight fixture comprising:

a. a motorcycle mounting component mounted on the front fork of said motorcycle;

b. a motorcycle headlight extension component having a mounting end which is connected to said motorcycle mounting component and a distal end extending to a forward position of the motorcycle in proximity to the front wheel thereof c. a motorcycle headlight socket component secured to the distal end of said motorcycle headlight extension component.

* * * * *